July 1, 1969  B. A. ARVIDSON ET AL  3,453,167

PACKAGE HANDLING MECHANISM

Filed May 13, 1966  Sheet 1 of 5

Inventors:-
Bengt A. Arvidson
Ralph F. Barber,
By Hofgren, Wegner, Allen, Stellman & McCord
Attys.

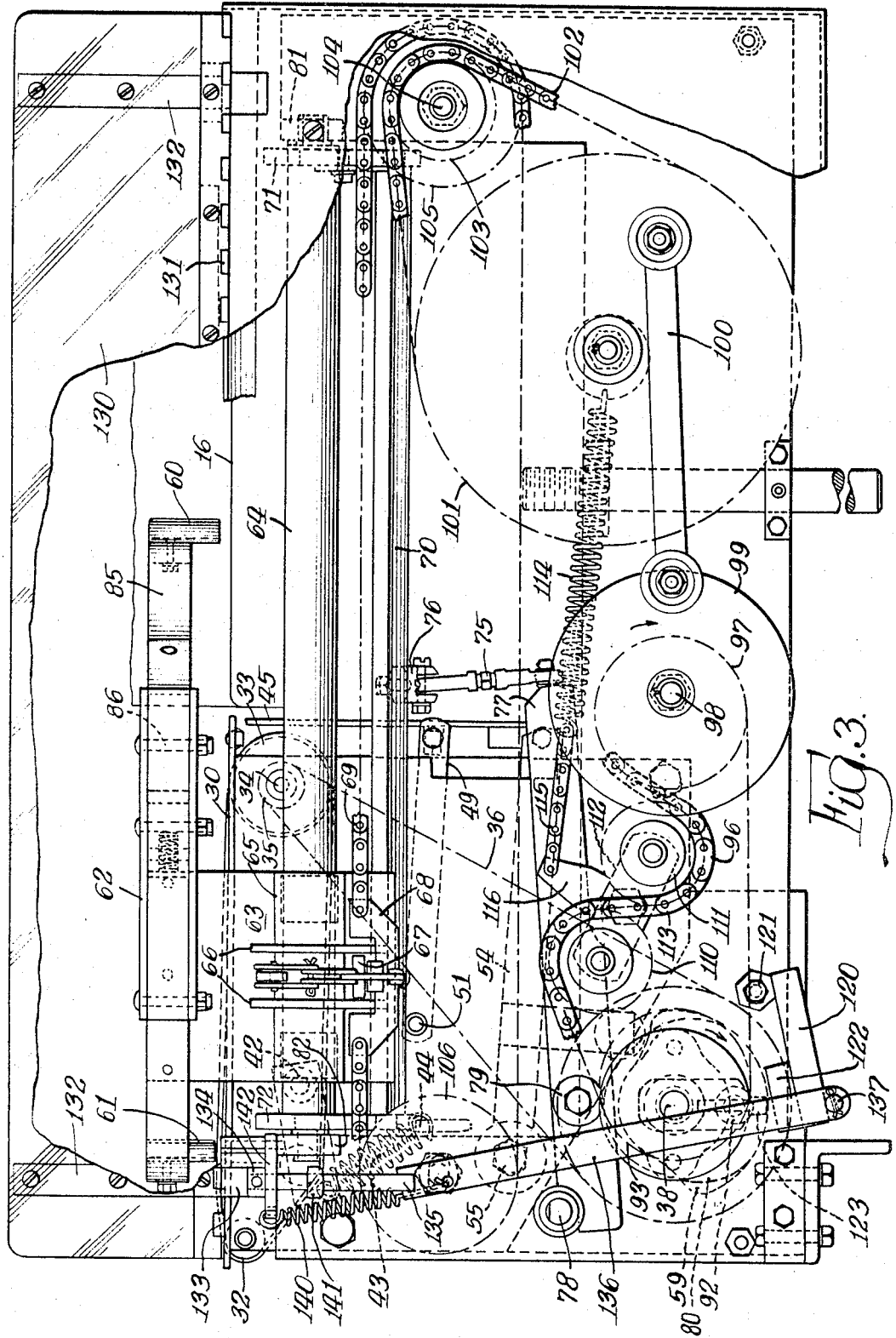

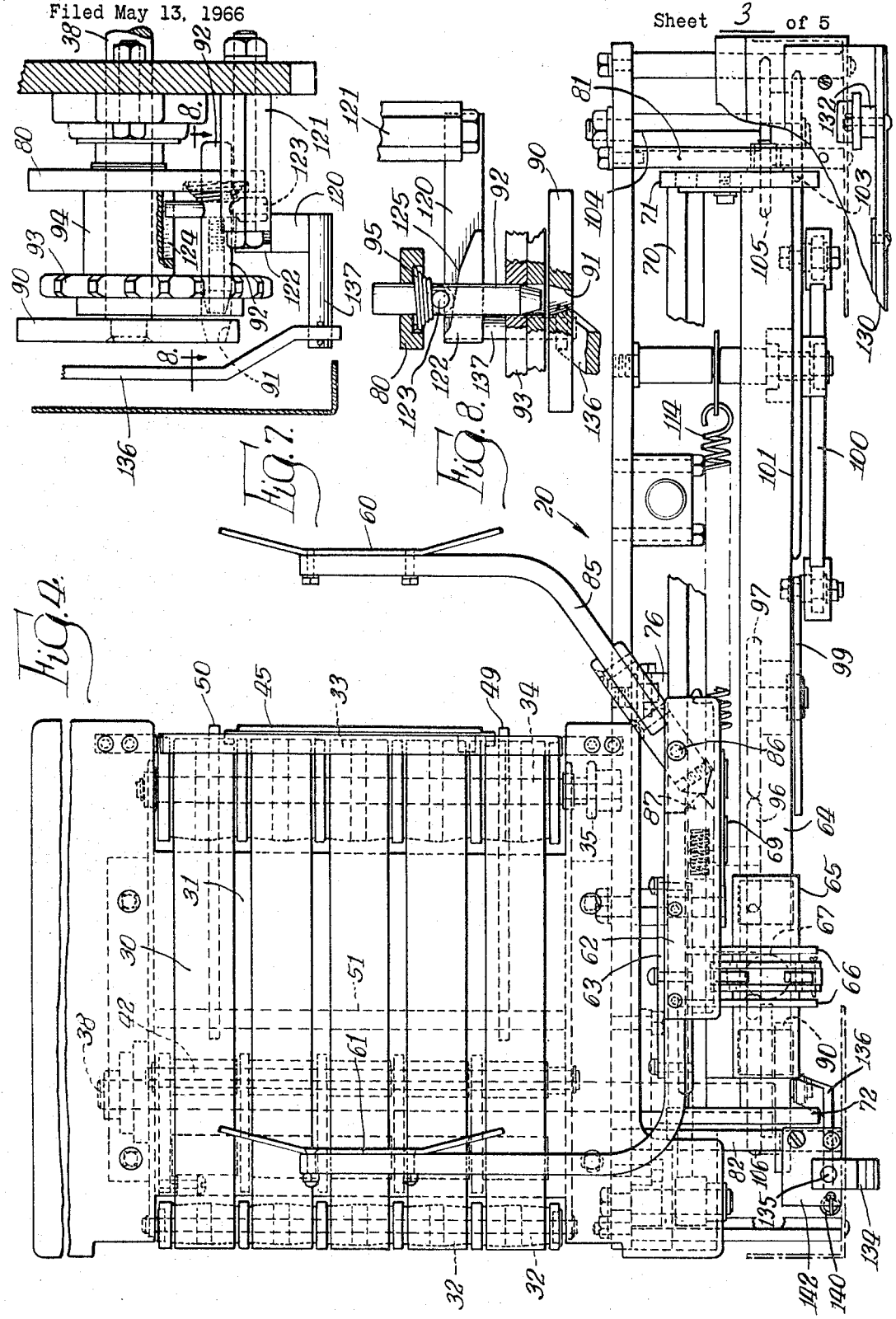

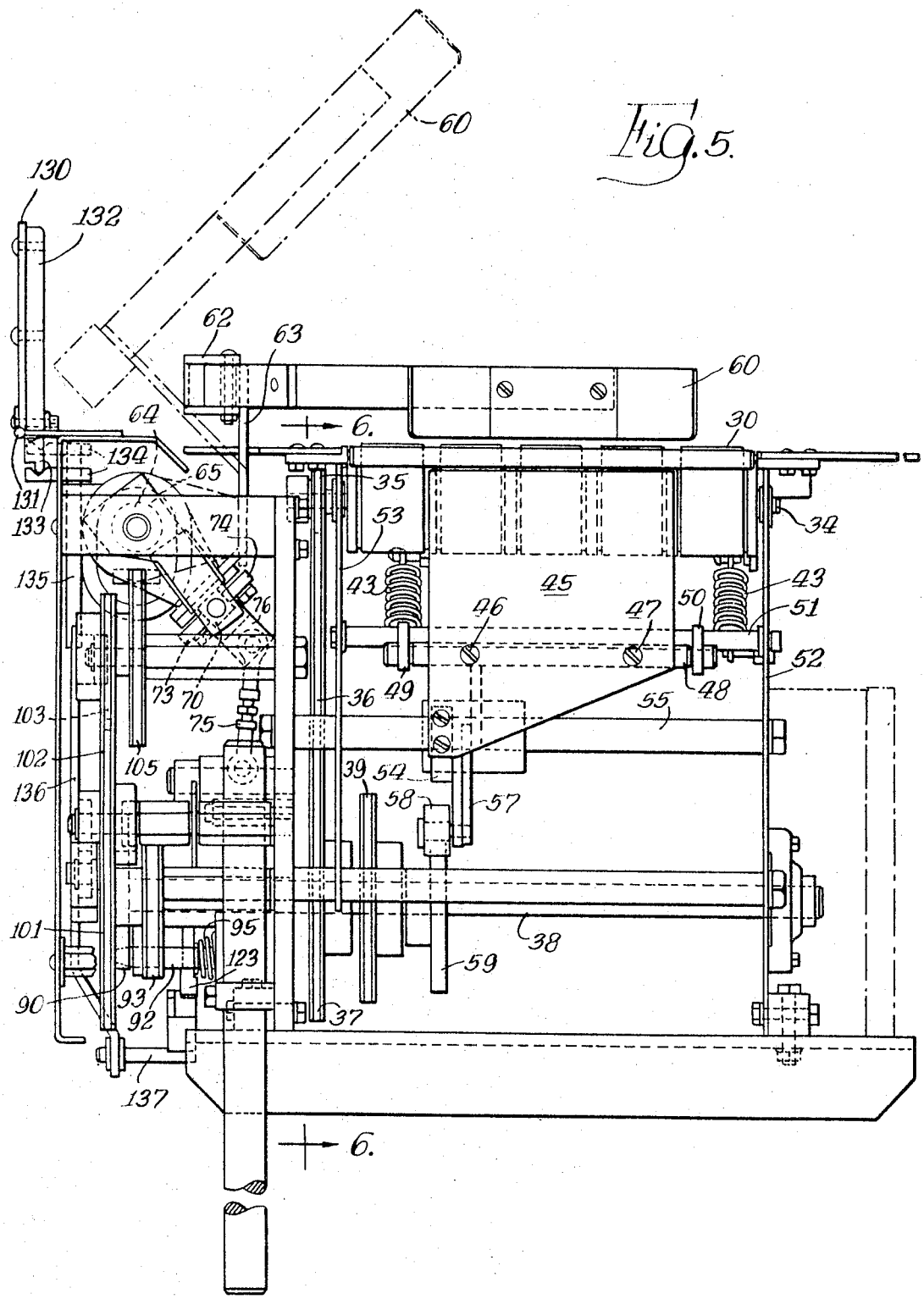

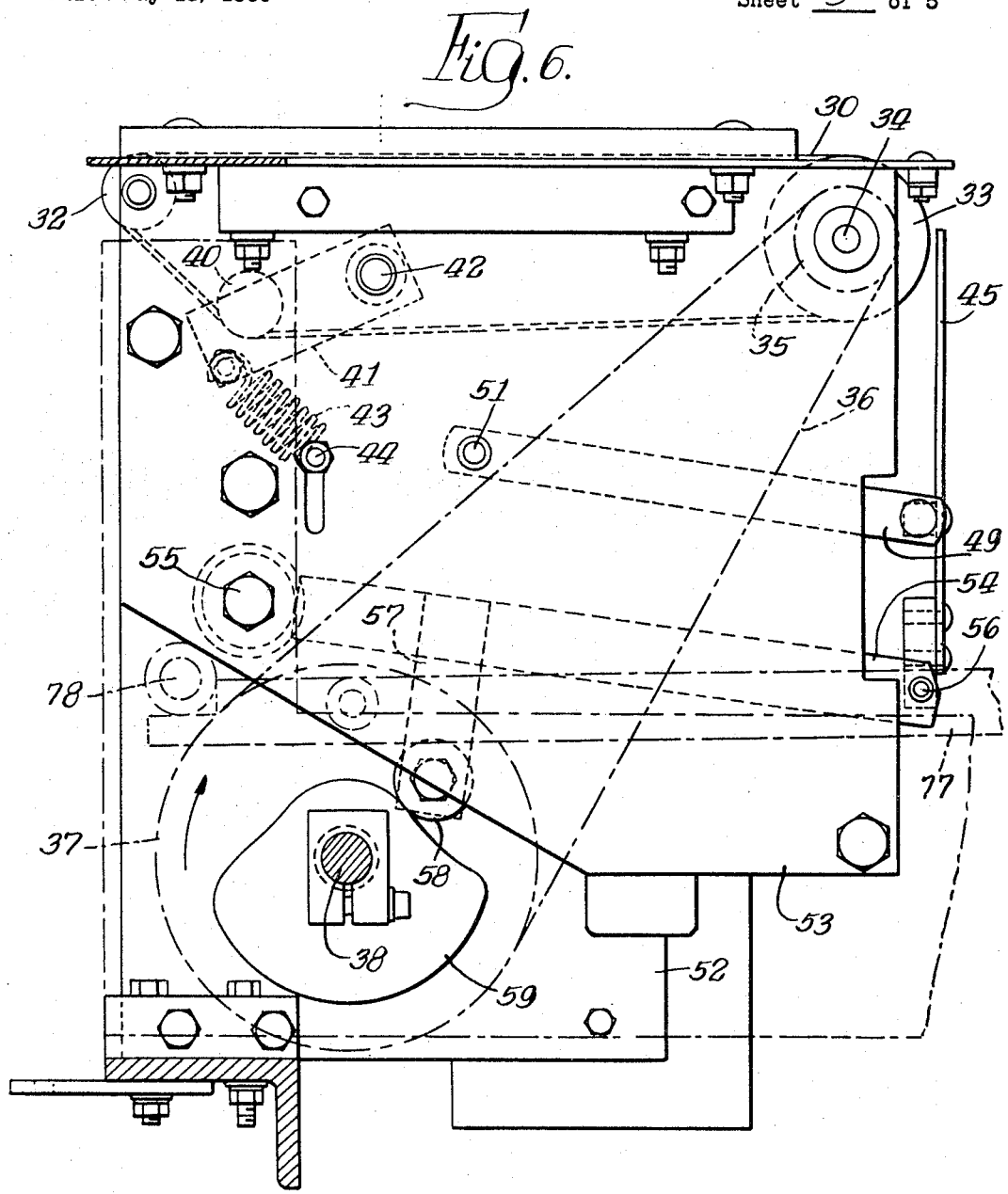

United States Patent Office 3,453,167
Patented July 1, 1969

3,453,167
PACKAGE HANDLING MECHANISM
Bengt A. Arvidson, Villa Park, and Ralph F. Barber, Elmhurst, Ill., assignors to Corley-Miller, Inc., a corporation of Ohio
Filed May 13, 1966, Ser. No. 550,023
Int. Cl. F16p 3/12; G01g 13/00
U.S. Cl. 156—360                                11 Claims This invention relates to package handling mechanism and, more particularly, to such a mechanism in combination with package wrapping, weighing and labelling structure.

An object of this invention is to provide a new and improved package handling structure for use in combination with mechanism for weighing and labelling wrapped packages.

Another object of the invention is to provide a combination of package handling and weighing mechanisms in which conveying structure intermittently advances packages to the platform of a weighing scale with means being provided to terminate the package conveying mechanism operation with the conveying members located in a position free of the scale platform to permit hand weighing of large packages.

A further object of the invention is to provide a mechanism as defined in the preceding paragraph in which a safety guard panel is positioned in front of the scale to prevent an operator from contacting the package conveying mechanism and wherein movement of the safety panel stops the actuation of the conveying mechanism, with the conveying members being stopped automatically in a position free of the scale platform whereby hand labelling can easily be accomplished if this is the desired operation produced by movement of the safety panel.

Still another object of the invention is to provide mechanism as defined in the preceding paragraphs wherein the package conveying mechanism for moving packages across the scale platform includes reciprocating pusher members with the pusher members having a fast advancing travel to move a package onto the scale platform and a relatively slow return travel to provide adequate time for the scale to make weight, with the drive for the pushers including a pair of eccentric rotatable drive members to provide this different rate of travel for the pushers.

Further objects and advantages will become apparent from the following detailed description taken in connection with the accompanying drawings in which:

FIG. 3 is a fragmentary front elevational view of the package handling mechanism with parts broken away and showing the package pushers at the rearmost position of travel and toward the left in the figure;

FIG. 4 is a plan view of the structure shown in FIG. 3;

FIG. 5 is an end elevational view, looking from the right of FIG. 4;

FIG. 6 is a vertical section, taken generally along the line 6—6 in FIG. 5 and showing a portion of the mechanism shown in FIG. 3;

FIG. 7 is a fragmentary, enlarged view of the mechanism shown at the lower left of FIG. 5; and FIG. 8 is a fragmentary plan section taken along the line 8—8 in FIG. 7.

Figure 1:
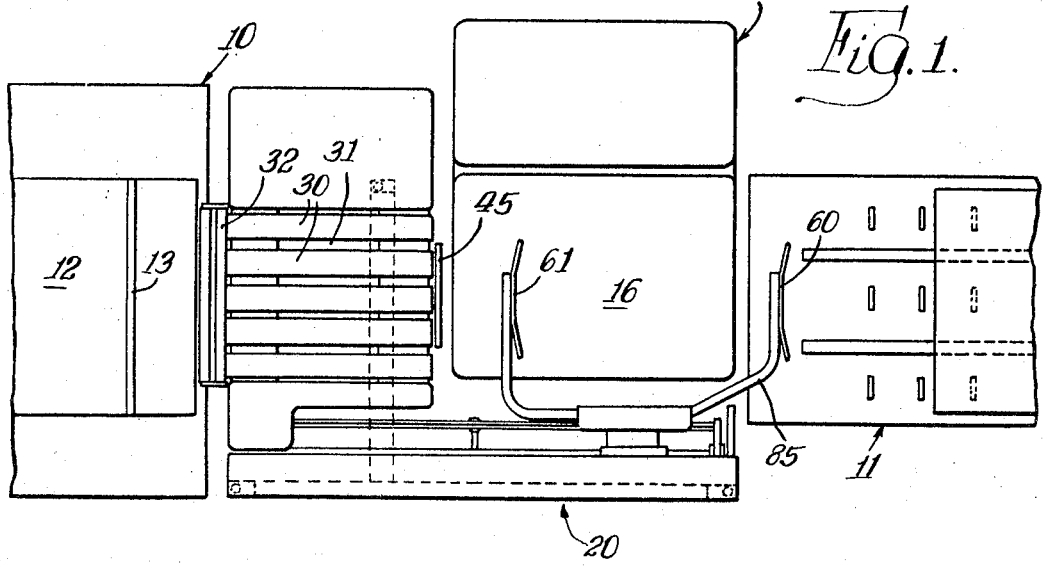
FIG. 1 is a plan view of the combination of package wrapping, weighing and labelling structure in association with the package handling mechanism of this invention.

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

Figure 2:
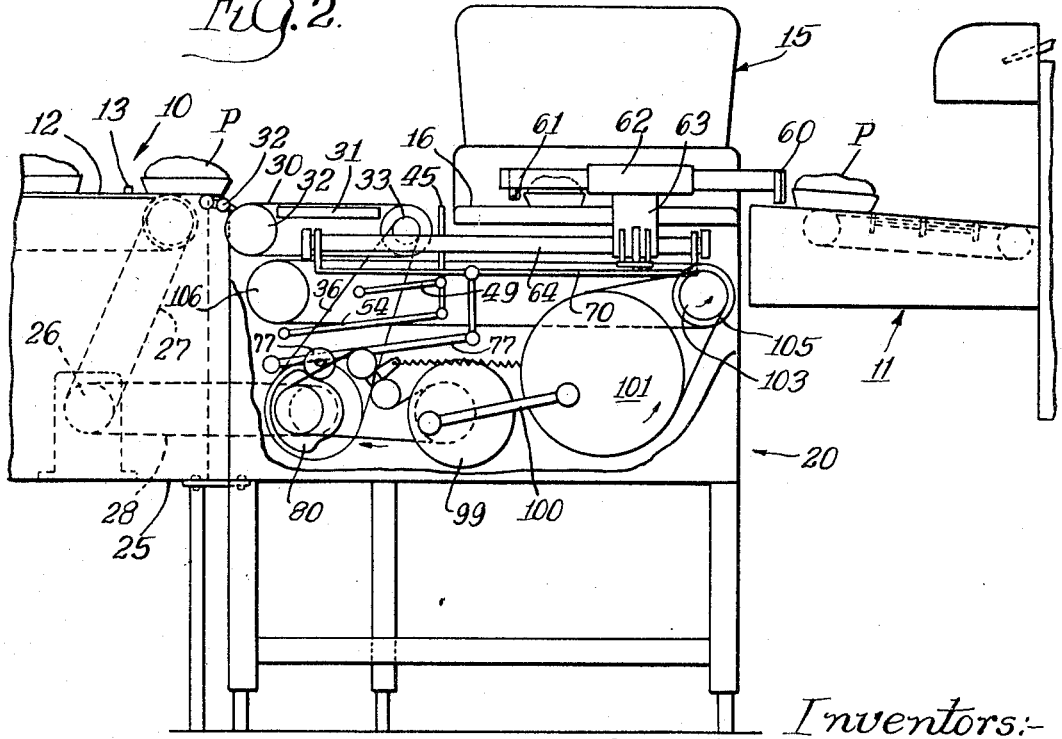
FIG. 2 is a front elevational view of the structure shown in FIG. 1, with the front panel broken away.

The over-all combinaion of structure is shown in FIGS. 1 and 2 wherein a wrapping machine, indicated generally at 10, is at the left-hand end of the mechanism and a package labelling structure, indicated generally at 11, is at the other end of the mechanism. These constructions can be of the type shown in the copending application of Arvidson and Treiber, Ser. No. 451,742, filed Apr. 29, 1965, now Patent No. 3,342,661, which discloses a wrapping machine in conjunction with a weighing scale and labelling mechanism. The wrapping machine, as shown in this application, differs from that shown in the prior application in that the wrapping machine has a belt conveyor 12 with package-engaging lugs 13 for moving a package P out of the wrapping machine into the package handling mechanism, subsequently to be described.

In the over-all operation, a wrapped package, coming out of the wrapping machine or from some form of conveyor structure, is delivered to the package handling mechanism of this invention and moved onto a scale platform where the package is weighed and then subsequently moved from the scale platform to the labelling mechanism 11 where a label, previously printed with the weight of the package and the price thereof, is applied onto the package. The scale is indicated generally at 15 and has a scale platform 16.

The package handling mechanism, indicated generally at 20, is positioned between the end of the wrapping machine 10 or other machine and the package labeller 11 and generally surrounds the scale platform 16, as shown in FIGS. 1 and 2.

The wrapping machine 10, as an example, can have a framework 25 with a power source 26 which, through a chain 27, drives the conveyor 12 and which provides a power take-off through a chain 28 to the package handling mechanism 20.

The package handling mechanism 20 includes a first, continuously-operated conveyor having a plurality of spaced belts 30 which have the upper reach thereof overlying a support plate 31 and which have their entry ends extending to a position adjacent a pair of lead-in rollers 32. The endless belts 30 pass about a series of rear guide rollers 32 extending from front to rear of the machine and about a front series of driving rollers 33 mounted on a shaft 34 extending from front to rear of the machine and having a driven sprocket 35 thereon driven by a chain 36 which passes about a drive sprocket 37 on a drive shaft 38. The drive shaft 38 has a sprocket 39 thereon which is driven by the chain 28 from the wrapping machine.

A series of idler take-up rollers 40, each mounted on a lever 41 pivoted on a transverse shaft 42, engage the belts 30 to take up slack therein. They are urged against the belts by springs 43 connected between each of the levers 41 and a shaft 44 extending from front to rear of the unit.

The belts 30 of the first conveying means advance a package into a position to engage against a cyclically-movable stop 45 which can move from a retracted position, shown in FIGS. 2 and 6, to an elevated position at a height above the upper reach of the belts 30 to block a package advanced by the belts. The stop 45 is in the form of a plate fastened at 46 and 47 to a transverse bar 48 which is pivoted at its ends to a pair of arms 49 and 50 which are guiding arms for the stop 45 in its up and down movement and which are attached to a pivot shaft 51 extending between the plates 52 and 53 of the frame. The stop is caused to move up and down by an actuating arm 54 which is pivoted to the frame at 55 and, at its other end, is pivotally connected at 56 to the lower end of the stop plate. The actuating arm 54 has a downwardly-extending arm 57 intermediate its ends having a follower roller 58 which engages a cam 59 on the drive shaft 38 with the cam 59 shaped to provide upper positioning of the stop 45 during a part of the cycle and lowering of the stop during another part of the cycle to permit advance of the package.

The stop 45 is located immediately in front of the scale platform 16, as shown in FIG. 1, whereby when the package stop 45 is lowered a package can be advanced onto the scale platform and have the weight thereof read and then the package is moved off the scale platform to a succeeding station where the labelling mechanism 11 applies a label to the package corresponding to the weight and price of the package.

Package handling mechanism is provided to move a package across the location of the stop onto the scale platform and, after a period of time, to move the package off the platform to the labelling station. This mechanism comprises a pair of pusher arms 60 and 61 having a mounting base 62 connected to a vertically-extending plate 63 which at its lower end turns forwardly to a position under a guide rod 64 and connects to a sleeve 65 slidable along the rod 64. The sleeve 65 has a pair of flanges 66 which engage opposite sides of a roller 67 carried on a bracket 68 connected to opposite ends of a sprocket chain 69. Thus, as the chain 69 is caused to travel back and forth, the bracket 68 is given corresponding movement and through the connection between roller 67 and flanges 66 this same movement is imparted to the sleeve and the pusher arms 60 and 61 carried thereby. Pushers 60 and 61 when in their advancing movement directly overlie the conveyor belts 30 and the scale platform 16, as shown in the full line position in FIG. 5. In their reverse travel, they must pass over packages and are shifted upwardly to the broken line position shown in FIG. 5. This action is accomplished by use of a guide bar extending in spaced parallel relation to the guide rod 64 and, at its opposite ends, connected thereto by brackets 71 and 72 whereby rocking movement of the bar 70 about the axis of the guide rod 64 results in rotation of the rod. The guide bar 70 has a pair of rollers 73 and 74 engageable therewith against the upper and lower surfaces thereof, with these rollers carried at the lower end of the plate 63 whereby the pushers can move relative to the guide bar lengthwise thereof but, as the guide bar rocks about the axis of guide rod 64, the pushers will be caused to move between the full and broken line positions shown in FIG. 5. The rocking of the guide bar 70 is effected through a link 75 connected at its upper end to a bracket 76 connected to the guide bar 70 and, at its lower end, to a lever arm 77 which, as shown in FIG. 3, is pivoted at its rear end to a shaft 78 and intermediate its ends has a cam follower roller 79 engageable with a cam 80 on the drive shaft 38. This cam is shown in FIG. 7 and is loosely mounted on the drive shaft 38, as more fully described subsequently. With the cam 80 having alternate highs and lows, the guide bar 70 will be elevated as the pushers 60 and 61 are to return to the left position shown in FIG. 4 to pass over packages and, as the pushers are to begin their advancing movement of packages, the guide bar 70 is lowered to bring the pushers to the full line position of FIG. 5 to engage behind and advance packages. The guide rod 64 is rotatably mounted in mounting plates 81 and 82 at opposite ends thereof to permit rocking of guide bar 70.

The pusher 60 is carried on an arm 85 pivoted at 86 to the mounting base 62 and is yieldably held in the position shown in FIG. 4, but can be rocked in a clockwise direction against a yieldable latch 87 when it is desired to have the pusher 60 out of the way of the scale platform when manually weighing large packages.

Drive means for reciprocating the pushers 60 and 61 is driven from the drive shaft 38. Referring particularly to FIG. 7, the drive shaft 38 drives a disc 90 at an end thereof which has an opening 91 engageable by a clutch pin 92 movable in a driven member having the cam 80 previously referred to and a sprocket 93 interconnected by a sleeve 94, with the pin urged by a spring 95 into the opening 91. When the pin is not restrained, it is in the opening 91, with the result that the sprocket 93 and cam 80 are driven from the disc 90. This results in drive of a chain 96 which passes about a sprocket 97 on a shaft 98, which is connected to a crank 99 which, through a crank link 100, drives a sprocket 101 having a chain 102 which drives a sprocket 103 on a shaft 104. The sprocket 103 has a sprocket 105 integral therewith, about which the chain 69 extends, whereby oscillation of the sprocket 101 results in back and forth travel of the chain 69, resulting from oscillation of the sprocket 105 and with the chain 69 also passing about a sprocket 106 at the left-hand end of the machine.

If the scale can make weight in approximately one-half of the cycle of operation, then the rate of travel of the pushers 60 and 61 in each direction can be approximately equal. However with some scales, it is found that more than one-half of the cycle time is needed to make weight for a package and, therefore, mechanism is provided to advance the pushers 60 and 61 during a portion less than half the cycle time and provide more than half the cycle for return of the pushers, which results in a greater portion of the cycle time being available for making weight of the package. This means in the drive train includes the eccentric mounting of the sprockets 93 and 97, as shown in FIG. 3, wherein with the parts as positioned in FIG. 3, and with the sprocket 97 rotating in a clockwise direction, the crank 99 is functioning to move the sprocket 101 in a clockwise direction and the large diameter section of sprocket 93 is moving to the left of drive shaft 38, as viewed in FIG. 3, whereby not only is the sprocket 97 rotated by the linear movement imparted by rotation of the shaft 38, but also is additionally rotated by movement of the sprocket as created by the larger part or diameter of the sprocket 93 becoming effective. This will result in variable effective lengths of the chain 96 and slack take-up means are provided in the form of a pair of sprockets 110 and 111 mounted on an arm 112 and pivoted at 113. The arm 112 is urged in a clockwise pivoting direction, as viewed in FIG. 3, under the urging of a spring 114 connected to the frame and to a length of chain 115 connected to an upstanding part 116 of the arm 112.

When weighing large packages, it is desirable to stop the pushers 60 and 61 in a position in which the scale platform is unobstructed and in a position to the left of the position shown for the pushers in FIG. 1. This is accomplished by providing for disengagement of the clutch pin 92 in a particular rotative position of the drive sprocket 93, which drives the pushers 60 and 61. Means for disengaging the drive pin at this particular location are shown particularly in FIGS. 3, 5, 7 and 8, wherein a pivoted arm 120 pivoted about a pivot point 121 carries a wedge block 122 for up and down racking movement between an unobstructing position, shown in FIG. 3, and a position in which the wedge block 122 is elevated to be at the same level as a roller 123 extending through the clutch pin 92 and having its opposite end in a key 124 in the driven member sleeve 94 to prevent rotation thereof, whereby the surface 125 of the wedge block which extends vertically will engage the roller 123 and shift the pin 92 against the spring 95 to withdraw the pin from the disc opening 91. This action will occur in one rotative position of the drive sprocket 93, so that when the pushers 60 and 61 stop, this can be a controlled position, with the pushers clear of the scale platform 16. The wedge surface 125 acts to positively stop the pushers and prevent overtravel. It is important that the pushers 60 and 61 again start operation in timed relation with other mechanisms, such as the cyclically-operable stop plate 45, and it will be seen that the same drive relation is resumed, since the drive sprocket 93 cannot commence rotation until the drive disc 90 on drive shaft 38 has rotated to a position to bring the opening 91 into alignment with the drive pin 92. The wedge block 122 has to be lowered to permit this and even though it may have been lowered prior to this time, the drive will not be engaged until the pin 92 can move into the opening 91 in the disc 90. This insures that once the drive is disengaged the cycling will again be in timed relation when the drive is reengaged.

Means are provided for automatically controlling the drive pin 92 by positioning of a guard or safety panel 130 which, as shown in FIG. 3 and FIG. 5, extends along the front of the machine and is normally in an upright position but can be pivoted downwardly and forwardly about a hinge member 131 connecting the panel to the frame of the machine. A bracket 132 fastened to the front of the panel 130 has a lower end 133 engageable with a block 134 at the upper end of a rod 135 connected to an arm 136 which extends downwardly and is connected to a pin 137 on the wedge mounting arm 120. When the panel 130 is up, the lug 133 is urging the button 134 down to hold the wedge block 122 below the level of the roller 123 on the clutch pin 92. If the guard panel should be swung downwardly and forwardly to come out of obstructing relation with the scale platform 16 and the pushers 60 and 61, the lug 133 is moved off the button 134 and a spring 140 becomes effective to lift the link 136 and raise the wedge block 122 to the level of the roller 123, so that during the course of a revolution of the drive disc 90 the pin 92 will be removed from disc opening 91. This elevating movement of the link 136 is limited by a stop collar 141 on the rod 135 engageable against a stop plate 142 on the frame.

The safety panel 130, by its movement, insures that, if inadvertently the panel is lowered to expose the pushers 60 and 61, the pushers will stop and if the panel is intentionally moved, the pushers 60 and 61 will be stopped in a position clear of the scale platform 16 and the pusher arm 85 for pusher 60 can be pivoted about pivot 86 to provide further clearance around the scale platform 16 to permit weighing of large packages.

In the operation of the mechanism herein described, a package is delivered onto the conveyor belts 30 at the left-hand end of the machine and a package is advanced against the elevated stop plate 45. The next step in a cycle of operation is to have the pusher 61 engage behind a package, the stop plate 45 lower and the pusher 61 advance the package onto the scale platform 16. The pushers 60 and 61 are then elevated to return, with the stop plate 45 again elevated to stop a succeeding package and the pusher 61 descends behind the next package on the conveyor belts 30. The stop plate 45 lowers and the next package is moved onto the scale platform while the preceding package is moved from the scale platform by the leading pusher 60 into the labelling mechanism 11. As pointed out previously, if at any time it is desired to hand-weigh packages, then the guard panel 130 can be lowered to stop the pushers 60 and 61 in an unobstructing relation to the scale platform 16. Although the mechanism has been disclosed as being driven from an adjacent machine, the package handling mechanism can be provided with its own source of power, if desired.

We claim:

1. A package handling and weighing system comprising, a scale having a scale platform, a package conveyor for moving a package onto the scale platform and in a succeeding cycle move the package off the platform including a pair of spaced apart package pushers, means mounting the package pushers for reciprocating movement, drive means including a releasable clutch for said pushers, means mounting the package pushers for up and down movement to clear a package on the return stroke of the pushers, a movable guard panel to block an operator from the pushers, and means responsive to movement of the guard panel to disengage the clutch at a particular point in the cycle to have the pushers stop clear of the scale platform.

2. A package handling and weighing system as defined in claim 1 in which said drive means includes a continuously operable drive shaft and disc, a drive train for said pushers and said clutch interconnects said disc and drive train.

3. A package handling and weighing system as defined in claim 2 in which said clutch includes a retractable pin engaging an opening in said disc, and a wedge block movable by said guard panel to have a position to retract the pin from the disc opening at a certain point in rotation of the drive means when the panel is moved whereby the drive is re-engaged at a certain point in the cycle by the pin re-entering the opening in the continuously rotating disc.

4. A package handling and weighing system as defined in claim 1 and said drive means including structure to have the time of the return portion of the pusher reciprocating movement exceed the advance portion whereby the scale has time to make package weight.

5. A combination of package wrapping, weighing and labelling structure comprising a package wrapping machine having an exist end, a scale with a scale platform for receiving a package from the wrapping machine and determining the package weight, a package labeller for receiving a package from the scale platform and placing a label on the package, a package conveying mechanism for receiving packages from the wrapping machine and sequentially moving packages onto the scale platform and thereafter removing the package from the platform after making weight including a first continuous conveyor in advance of said platform for receiving a package from the wrapping machine, a cyclically movable stop between the first conveyor and scale platform for holding a package advanced by the first conveyor, means for advancing a package from the stop and onto the scale platform and subsequently from the platform including a pair of spaced apart package pushers, means for reciprocating said pushers to have one pusher move between the first conveyor and the scale platform and the second pusher move between the platform and the package labeller, and a releasable clutch in the drive for said pushers, and means for disengaging said clutch when the pushers are in unobstructing relation with said platform.

6. A combination as defined in claim 5 including a movable safety panel in front of said scale platform, and said clutch disengaging means is operated by movement of said safety panel.

7. A combination as defined in claim 6 in which said clutch disengaging means includes a movable wedge, and said releasable clutch including a retractable pin with a follower selectively engageable by said wedge with said wedge shaped to retract said pin and hold the pin against movement.

8. A combination as defined in claim 5 in which said pusher reciprocating means includes a pair of sprockets interconnected by a chain, means mounting said sprockets eccentrically to vary the rate at which one sprocket is driven by the other to vary the rate of travel of the pushers, and chain take-up means for taking up slack chain during rotation of the eccentric sprockets.

9. A package handling mechanism comprising a first conveyor continuously operable for advance of packages, a movable stop at the end of the first conveyor for blocking further advance of packages, a pair of spaced apart reciprocating package pushers with one pusher movable between the first conveyor and a succeeding station and the other pusher movable between the succeeding station and therebeyond, drive mechanism comprising a continuously rotating drive shaft, a first drive train from said shaft to said first coveyor, a first cam on said shaft, means operable by said cam for cycling said stop up and down in each cycle of package advance, means mounting said pushers for reciprocating movements, a second drive train for reciprocating said pushers from said drive shaft including a drive disc on said shaft having an opening therein, a driven member loosely mounted on said shaft including a second cam, a clutch pin on said driven member engageable in said disc opening to rotate the driven member with the disc, means for pulling the pin from the disc opening in one rotative position of the driven member to stop the driven member and the pushers, and means operated by said second cam for raising said pushers over packages during their return stroke.

10. A package handling mechanism as defined in claim 9 in which said pin pulling means includes a wedge movable between an inoperative position and a position adjacent said pin, and a movable guard panel for positioning said wedge.

11. A package handling mechanism as defined in claim 10 in which a scale platform is located at said succeeding station, said one rotative position of the driven member is selected to have the pushers stop clear of the platform, and means mounting one pusher for pivotal movement to enlarge the space at the scale platform whereby lowering of the guard panel permits hand weighing of large packages.

References Cited

UNITED STATES PATENTS

| | | | |
|---|---|---|---|
| 3,194,710 | 7/1965 | Stremke et al. | 156—360 |
| 3,372,079 | 3/1968 | Fellner et al. | 156—360 |
| 3,394,792 | 7/1968 | Arvidson et al. | 198—39 |

EARL M. BERGERT, *Primary Examiner.*

T. R. SAVOIE, *Assistant Examiner.*

U.S. Cl. X.R.

198—24, 39; 214—2